United States Patent [19]

Cornwell

[11] 4,355,060

[45] Oct. 19, 1982

[54] HIGH TEMPERATURE CEMENTITIOUS COATINGS WITH IMPROVED CORROSION RESISTANCE AND METHODS OF APPLICATION

[76] Inventor: Charles E. Cornwell, 7104 Marlan Dr., Alexandria, Va. 22307

[21] Appl. No.: 292,501

[22] Filed: Aug. 13, 1981

[51] Int. Cl.$^3$ .......................... B05D 1/02; C04B 9/02
[52] U.S. Cl. ................................ 427/427; 106/14.12; 106/14.14; 106/14.41; 106/314; 428/332; 427/397.7
[58] Field of Search ............... 106/14.12, 14.14, 14.41, 106/314; 427/189, 427, 397.7; 428/332

[56] References Cited

U.S. PATENT DOCUMENTS 4,088,804  5/1978  Cornwell et al. ............... 427/427 X
4,294,621 10/1981  Maurer et al. ................ 106/14.12 X Primary Examiner—Michael R. Lusignan

[57] ABSTRACT

A high temperature protective coating with improved corrosion resistance and method of application for fast setting magnesium oxide, fly ash and other finely divided mineral aggregates with ammonium phosphates in aqueous solution, wherein the composition of the phosphates is at least about 20% by weight polyphosphates, balance orthophosphate, and allowing the sprayed mixture to set at more than two mils thickness.

3 Claims, No Drawings

HIGH TEMPERATURE CEMENTITIOUS COATINGS WITH IMPROVED CORROSION RESISTANCE AND METHODS OF APPLICATION

BACKGROUND OF THE INVENTION

A requirement has existed for many years for a fast-setting high temperature coating with protective qualities in reducing abrasion, water damage, heat degradation, corrosion resistance, smoke, toxic fumes and fuel contribution when exposed to fire. Such a coating can only be made with mostly inorganic materials.

Extensive tests have been completed upon this inventor's cementitious coatings: i.e. U.S. Pat. No. 4,088,804, a portland cement or calcium aluminate cement base was found acceptable in high temperature exposure. However, time required to cure made it less practical for application in temperatures below 40° F. This application being presented has been tested and overcomes these problems.

As has been evidenced in several recent hotel fires, the organic paints have been a major cause of flame spread and noxious smoke fumes. Of these "fire resistant" organic paints in use, description indicates them to be self extinguishing. Actual experience though shows they will burn as long as flame exists and damage complete.

Fire proofing is a term used for materials applied to steel or other substrates for insulation and building codes require a period of time to keep the substrate from reaching 1000° F. from a fire. A fireproof coating is one that will not burn at any temperature, it will not smoke or contribute to flame spread. However, it is not insulative and has practically no value in reducing temperatures. When this fireproof coating is applied over a fireproofing material there is an advantage. This coating acts as a sealer and reduces flame penetration and water damage.

The automotive and marine industry have a severe corrosion problem and part of the problem is caused by heat, abrasion and salt. Highway bridges supported by steel are in serious trouble from salt spread on the road in icy conditions. A good coating that will reduce the problems is an obvious requirement, particularly if this coating can be applied in temperatures below 40° F. and be usable under one hour. This could include pavement stripping on highways where other coatings have failures in cold weather. The aqueous solution can be heated for even faster curing.

SUMMARY OF THE INVENTION

The present invention consists of formulating finely divided mineral aggregates including magnesia and fly ash with ammonium phosphates in aqueous solutions, wherein the composition of the phosphate is at least about 20% by weight polyphosphates, balance orthophosphate. The exothermic reaction of polyphosphate with magnesia or fly ash or combinations of both, causes the material to set very rapidly into a useful product. The polyphosphate-magnesia-fly ash is the bonding system and the finely divided minerals make a "tight" homogeneous coating.

It was found that fly ash, particularly from the Mid-West reacts about the same as magnesium oxide when combined with polyphosphate. The fly ash is a waste product which is most widely produced from coal burning power plants.

About 75–85% of the resulting coal ash is carried out of the furnace with flue gases and is known as "pulverized fuel ash". The remainder falls to the bottom of the furnace where it sinters to form a coarser material known as "furnace bottom ash". Some plants extract the pulverized fuel ash by passing through a cyclone collector which removes the coarser and heavier fractions, and then through one or more electrostatic precipitators to remove the finer and lighter materials. Of the lighter materials more than 70% by weight is finer than 53 micron (300 mesh). In Table 1 where fly ash is shown it is the lighter-finer material being used in combination with the others. This fly ash will all pass through a 200 mesh screen.

All of the other finely divided mineral pigments shown in Table 1 will pass through a 200 mesh screen. Silica, amorphous silica and calcium carbonate are all well known mineral pigments. Wollastonite P-1 is a natural occurring calcium silicate with an acicular crystaline structure. The melting temperature is more than 2800° F.; it is ground to various sizes. P-1 is a very fine grind and 100% will pass through a 200 mesh screen. These fine fibers are included in the formulation to "tie" the materials together and improve the flexural and impact strengths of the coating. Titanium dioxide, iron oxide, ferric oxide and chromium oxide are all color pigments used in this coating material.

Frit is "glass variously compounded that is quenched and ground as a basis for glazes or enamels". The frit can be formulated for various melting ranges. There are requirements where it is beneficial to have a hard ceramic type finish when the coating is heated to selected temperatures. The melting point of the frit used is above 1400° F.

Aerosil is a silica produced from silicon tetrachloride in a flame hydrolysis process with oxygen-hydrogen gas. The diameter of the primary particles varies from approximately 0.7 to 40 nanometers (millimicrons). The structure is amorphous. Aerosil is manufactured by Degussa. The trade name Cabosil is the same material. Aerosil is used as a thixotropic agent and it reduces the tendency of the coating from running when sprayed on a vertical surface.

Melment L-10, Lomar D and Mighty are all super water reducers and sometimes referred to as a super-plasticizer. These water reducers comprise the alkali metal salts of melamine sulfonic acid partially condensed with formaldehyde, the alkali metal salt of naphthalene sulfonic acid partially condensed with formaldehyde, and about 30–90 percent of the alkali metal salt of a high molecular weight condensation product of naphthalene-sulfonic acid and the balance 70–10 percent being the alkali salt of gluconic acid. There are variations in super water reducers. These super water reducer admixtures bring improved performance. It forms a lubricating film, enveloping both the cement and aggregate to reduce friction between the solids. It reduces shrinkage, increased impermeability and improved workability.

MECHANICS OF INVENTIONS

At the present time there is only one method known for commercial spraying application and this method is a matter of U.S. Patent Application by this inventor.

The primary reason for this new mixing and spraying technique is the extremely fast setting results when the liquid component is combined with the blended aggregates such as magnesium oxide and fly ash or combinations of all of them including the finely divided minerals. Tests have shown that the coating material can be formulated to set in approximately 8 seconds to a maximum of four minutes and still retain its integrity.

The only practical method of spraying this material is by air conveying the metered dry blended materials to entrance of a static in-line mixing device. There it is wet out with the required amount of an aqueous solution and conveyed through the static mixer to a spray nozzle for placing. U.S. Pat. No. 4,088,804 describes such a use for a different type of material.

A DETAILED DESCRIPTION OF THE INVENTION

Table 1 gives a summary of the compositions of Examples 1 to 14. These formulations were selected from more than 100 tests to show the flexibility of the materials and the compatability of the various combinations. All of the formulations were sprayed and tested for heat resistance and corrosion protection. The heat test consisted of applying a propane torch to the surface until the steel substrate turned red and then it was quenched in cold water. This test shows any smoke or fumes that may be emitted and the expansion and contraction coefficient of the coating with the steel. The coated steel plates were then placed outdoors for exposure and a 3% salt water solution was brushed on every day for 30 days. There is no corrosion and the coatings appear sound after 90 days. The coating is being tested in a commercial salt fog unit for 3000 hours and good results have been reported. The coating thickness can range from 2 mils to about 40 mils.

Examples 1-10 were made with magnesium oxide and polyphosphate as the bonding agent for the other finely divided mineral aggregates. They all show good corrosion resistance and good color retention. The bond to the steel was excellent. Examples 5 and 6 show more abrasion resistance which is caused by the addition of finely ground minerals and their inherent hardness.

Example 7 shows the use of a frit for high temperature applications. When heated to approximately 1700° F. the frit melts and the surface upon cooling becomes a hard ceramic finish.

Examples 11-14 show the use of fly ash and polyphosphate as the bonding agent for the other finely divided aggregates. This coating does not appear to be as corrosive resistant as those containing magnesium oxide. The bonding qualities are excellent, but no better than the others.

Examples 1-4 and 9 show a combination of magnesium oxide, fly ash and polyphosphate as the bonding agent for the other finely divided minerals. All of the qualities were excellent and very similar to examples 5-8 where fly ash was omitted. When fly ash is used it is not practical to obtain a pure white coating. The use of fly ash does reduce cost of materials, however, it is not normally used when a pure white coating is required.

TABLE 1

COATING FORMULATIONS - EXAMPLES 1-14

| | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| Dry Powder Component | | | | | | | | | | | | | | |
| Magnesium Oxide | 10 | 25 | 50 | 100 | 20 | 20 | 20 | 100 | 20 | 100 | — | — | — | — |
| Fly Ash | 20 | 40 | 100 | 400 | — | — | — | — | 25 | — | 100 | 100 | 100 | 100 |
| Silica | 20 | 40 | 80 | 600 | 40 | — | — | 25 | — | — | 25 | 25 | — | — |
| Amorphous Silica | — | 20 | 80 | 50 | 20 | 20 | — | — | — | — | — | 10 | — | — |
| Calcium Carbonate | — | — | — | — | — | 40 | — | — | 10 | — | — | — | 25 | — |
| Wollastonite P-1 | — | 10 | 80 | 50 | 20 | 20 | 10 | 10 | — | — | 20 | 20 | 20 | 20 |
| Titanium Dioxide | — | 3 | 6 | 25 | — | — | 3 | — | — | — | — | — | — | — |
| Iron Oxide | — | — | — | — | — | 3 | — | 3 | — | — | — | 3 | — | — |
| Chromium Oxide | — | — | — | — | 3 | — | — | — | 3 | — | — | — | 3 | — |
| Ceramic Frit | — | — | — | — | — | — | 40 | 25 | 25 | — | — | — | — | 40 |
| Aerosil | — | .34 | .87 | 3 | .25 | .22 | .16 | .35 | .22 | .25 | .36 | .39 | .32 | .35 |
| Liquid Component | | | | | | | | | | | | | | |
| Ammonium Polyphosphate | 30 | 80 | 180 | 500 | 40 | 40 | 30 | 80 | 46 | 58 | 60 | 60 | 67 | 86 |
| Water | — | 29 | 50 | 200 | 15 | 18 | 10 | 10 | — | — | 10 | 17 | 16 | 10 |
| Melment L-10 | — | 4 | 7 | — | — | 4 | 4 | — | — | — | 6 | — | — | 4 |
| Lomar-D | — | — | — | 35 | — | — | — | 6 | — | — | — | 4 | — | — |
| Mighty | — | — | — | — | 7 | — | — | — | 4 | — | — | — | 4 | — |

The presently preferred composition of the invention contain the following components, in the following ratios, expressed in parts by weight:

| Component | | Parts By Weight |
|---|---|---|
| Powder Component | Magnesium Oxide | 0-100 |
| | Fly Ash | 0-100 |
| | Silica | 0-600 |
| | Amorphous Silica | 0-80 |
| | Calcium Carbonate | 0-40 |
| | Wollastonite P-1 | 0-80 |
| | Titanium Dioxide | 0-25 |
| | Iron Oxide | 0-10 |
| | Chromium Oxide | 0-10 |
| | Ferric Oxide | 0-10 |
| | Ceramic Frit | 0-40 |
| | Aerosil | 0-1 |
| Liquid Component | Ammonium Polyphosphate in aqueous solution | 30-180 |

-continued

| Component | Parts By Weight |
| --- | --- |
| Water | 0–200 |
| Water Reducer (solids basis) | 0–15 |

What is claimed is:

1. A method of coating a substrate comprising:
   (a) establishing a mixture of
      (i) a refractory aggregate including magnesia and fly ash and other finely divided minerals and
      (ii) ammonium phosphate in aqueous solution, the composition of said phosphates being at best 20% polyphosphates, balance orthophosphate, the amounts of magnesia and phosphates in said mixture being effective to bond all of the aggregates into a solid continuous mixture and,
      (iii) metered liquid components;
   (b) applying said mixture by air conveying said mixture to a static mixing device wherein said metered liquid components are introduced just before said mixing device, the mixture being conveyed through said mixing device by air pressure and discharged through a spray nozzle onto said substrate resulting in a coating of about 2 mils to about 40 mils thickness.

2. A method according to claim 1, wherein said finely divided minerals in parts by weight comprise magnesium oxide, 0–100; fly ash, 0–100; combination of magnesium oxide and fly ash, 10–400; silica, 0–600; amorphous silica, 0–80; calcium carbonate, 0–40; wollastonite P-1, 0–80; color pigments, 0–25; ceramic frit, 0–40; aerosil, 0–1.

3. A method according to claim 1, wherein the said metered liquid components in parts by weight are ammonium polyphosphates in aqueous solution, 30–180; water, 0–200; and water reducer, 0–15.

* * * * *